United States Patent
Takashima

(10) Patent No.: US 6,914,753 B2
(45) Date of Patent: Jul. 5, 2005

(54) MAGNETIC DISK DEVICE ROTARY ACTUATOR WITH MAGNETIC LOCKING

(75) Inventor: Tetsuya Takashima, Touyo (JP)

(73) Assignee: Matsushita Electric Industrial Co., Ltd. (JP)

( * ) Notice: Subject to any disclaimer, the term of this patent is extended or adjusted under 35 U.S.C. 154(b) by 167 days.

(21) Appl. No.: 10/332,145

(22) PCT Filed: May 2, 2002

(86) PCT No.: PCT/JP02/04414

§ 371 (c)(1),
(2), (4) Date: Jan. 6, 2003

(87) PCT Pub. No.: WO02/091380

PCT Pub. Date: Nov. 14, 2002

(65) Prior Publication Data

US 2003/0103295 A1  Jun. 5, 2003

(30) Foreign Application Priority Data

May 7, 2001  (JP) .................... 2001-135654

(51) Int. Cl.⁷ ............................................. G11B 21/22
(52) U.S. Cl. .................................................. 360/256.2
(58) Field of Search .............................. 360/256, 256.2

(56) References Cited

U.S. PATENT DOCUMENTS

| | | | | |
|---|---|---|---|---|
| 5,566,375 A | * | 10/1996 | Isomura | 360/256.2 |
| 5,675,455 A | * | 10/1997 | Matsumoto | 360/256.2 |
| 5,801,904 A | * | 9/1998 | Kinoshita et al. | 360/256.2 |
| 6,028,744 A | * | 2/2000 | Amirkiai et al. | 360/256.2 |
| 6,137,658 A | * | 10/2000 | Matsuzaki et al. | 360/256.2 |
| 6,487,052 B1 | * | 11/2002 | Macpherson et al. | 360/256.2 |
| 6,654,207 B2 | * | 11/2003 | Hong et al. | 360/256.2 |

FOREIGN PATENT DOCUMENTS

| | | |
|---|---|---|
| JP | 5-166316 | 7/1993 |
| JP | 6-236645 | 8/1994 |
| JP | 2001-210039 | 8/2001 |

* cited by examiner

Primary Examiner—Brian E. Miller
(74) Attorney, Agent, or Firm—Parkhurst & Wendel, L.L.P.

(57) ABSTRACT

A magnetic disk device configured such that a carriage having an arm on one end and a coil on the other end is pivotally supported rotatably on a chassis, the arm having a magnetic head on its tip, the other end of the carriage loaded with the coil is placed in a magnetic circuit having a magnet the carriage is rotated around an axis core by driving force generated on the coil, and the tip of the arm having the magnetic head is moved over a magnetic disk and a retreat position on a ramp. In such a device, magnetized protrusion is provided on the proximal end of the arm.

3 Claims, 5 Drawing Sheets

MAGNETIC DISK DEVICE ROTARY ACTUATOR WITH MAGNETIC LOCKING

TECHNICAL FIELD

The present invention relates to a magnetic disk device.

BACKGROUND ART

As shown in FIG. 4, in a conventional magnetic disk device 1, a spindle motor (not shown) for holding a magnetic disk 2 between the spindle motor and a disk clamp 3 and rotating the magnetic disk 2, a carriage 4 having a magnetic head 4a for recording and reproducing information on the magnetic disk 2, and an actuator 5 for moving the magnetic head 4a via the carriage 4 are placed on a chassis 6.

An arm 8 having a suspension 7 for supporting the magnetic head 4a is mounted on one end of the carriage 4, the carriage 4 is pivotally supported by a shaft 9 rotatably on the chassis 6, and a coil 10 is mounted on the other end of the carriage 4, the shaft 9 being placed between the ends.

The actuator 5 is a voice coil motor (VCM) and is constituted by the coil 10 placed on the other end of the carriage 4, and a magnetic circuit which applies a magnetic field on the coil 10 and generates driving force for rotating the carriage 4 around the shaft core of the shaft 9. The magnetic circuit is formed by a pair of yokes 11 and a magnet 12, in which the yokes 11 are opposed so as to form a prescribed gap in which the other end of the carriage 4 can move, and the magnet 12 is fixed on one of the opposing surfaces of the yokes 11. Reference numeral 11a denotes shafts for forming the gap between the yokes 11, and reference numeral 11b denotes stoppers which are placed on the outer circumference of the shafts 11a to suppress excessive rotation of the carriage 4. The shafts 11a and the stoppers 11b are provided in pairs.

A ramp having an up grade and a down grade along the circumferential direction is provided on the circumference where, the tip of the suspension 7 is moved on the side of the magnetic disk 2. When the magnetic disk 1 is not operated, a load tab 7a at the tip of the suspension 7 is moved to a retreat position 13a after moving over the top of the ramp 13 to permit the suspension 7 (thus, the magnetic head 4a) to retreat from the magnetic disk 2.

When the suspension 7 is caused to retreat from the magnetic disk 2, the worst condition of unloading is that power supply to the magnetic disk device 1 is abruptly interrupted by an accident. In this case, counterelectromotive force of the spindle motor which is continuously rotated by counterelectromotive force is supplied to the coil 10, the carriage 4 is rotated by obtaining driving force of the coil 10, and the load tab 7a of the suspension 7 is caused to reach the retreat-position 13a.

However, when the magnetic disk device 1 is small, since the magnetic disk 2 has a small diameter and a light weight, inertial force is small and the rotation of the spindle motor is made for a short time. Thus, sufficient counterelectromotive force cannot be obtained and assist force is necessary to allow the load tab 7a of the suspension 7 to climb the ramp 13.

Hence, as shown in FIGS. 5 and 6, on a corner of the carriage 4 on the side of the magnetic disk 2, a lock part 14 is provided which is made of a magnetic material and is shaped like a letter L, and magnets 15 and 16 covered with rubber or resin are placed near the stopper 11b so as to face the sides of the lock part 14 shaped like the above described letter L. Thereby, when power supply is abruptly turned off, attractive force of the magnet 15 for attracting the lock part 14 is added to driving force generated on the coil 10, and the load tab 7a securely moves over the ramp 13. When the magnetic disk device 1 is not operated (when the magnetic head 4a retreats), the magnet 16 attracts the lock part 14 to lock the carriage 4 such that external impact does not move the suspension 7 (thus, the magnetic head 4a) onto the magnetic disk 2.

However, in recent years, high performance and miniaturization of magnetic disk devices have increased in demand and it has been more difficult to obtain a space for placing the above-described magnets 15 and 16. Although it is considered that the magnets 15 and 16 are reduced in size to obtain a space for placement, the small magnets 15 and 16 are hard to handle.

For this reason, the subject has been development of a magnetic disk device comprising a locking mechanism for miniaturization that permits an arm with a magnetic head to be placed at a retreat position on the side of a disk during unloading and non-operation.

DISCLOSURE OF INVENTION

In order to solve the above-described problem, according to the present invention, a magnetic disk device configured such that a carriage having an arm on one end and a coil on the other end is pivotally supported rotatably on a chassis, the arm having a magnetic head on its tip, the other end of the carriage having the coil is placed in a magnetic circuit formed by fixing a magnet on opposing surfaces of yokes opposed to each other with a prescribed gap, the carriage is rotated around an axis core by driving force generated on the coil, and the tip of the arm having the magnetic head is moved over a magnetic disk and a retreat position on a ramp placed near the magnetic disk, characterized in that a protrusion extending to the coil is provided on the proximal end of the arm so as to place the tip of the arm on the ramp, the protrusion is sucked by the magnet to maintain the rotation of the carriage in a fixed direction when the protrusion on the proximal end of the arm is positioned within a prescribed distance from the magnet of the magnetic circuit, and the tip of the arm is urged toward the retreat position. With this configuration, in accordance with the rotation range of the carriage (thus, the position of a high magnetic flux part), the shape of the ramp and so on, one of the following two functions is performed: the function of assisting force for allowing the tip of the arm to climb an oblique surface of the ramp during unloading and the function of locking the carriage during non-operation. Thereby, it is possible to achieve a locking mechanism for small devices without necessity for a special space for placement.

When the protrusion is provided, the protrusion is made of a magnetic material and can be attached on the proximal end of the arm which is made of a non-magnetic material. With this configuration, since movement is made on a magnetic disk for recording a magnetic signal, the arm made of the non-magnetic material can have the function of maintaining the rotation of the carriage in a fixed direction.

The arm and the protrusion may be integrally formed of a non-magnetic material and the protrusion may be magnetized during the molding. Namely, the following characteristic is used: when metal is bent or cut, the composition is changed and spontaneous magnetization occurs. Accordingly, the protrusion can have the function of maintaining the rotation of the carriage in the fixed direction without necessity for forming the arm and the protrusion as separate parts.

PREFERRED EMBODIMENT

An embodiment of the present invention will be discussed in accordance with the accompanying drawings.

Figure 1:
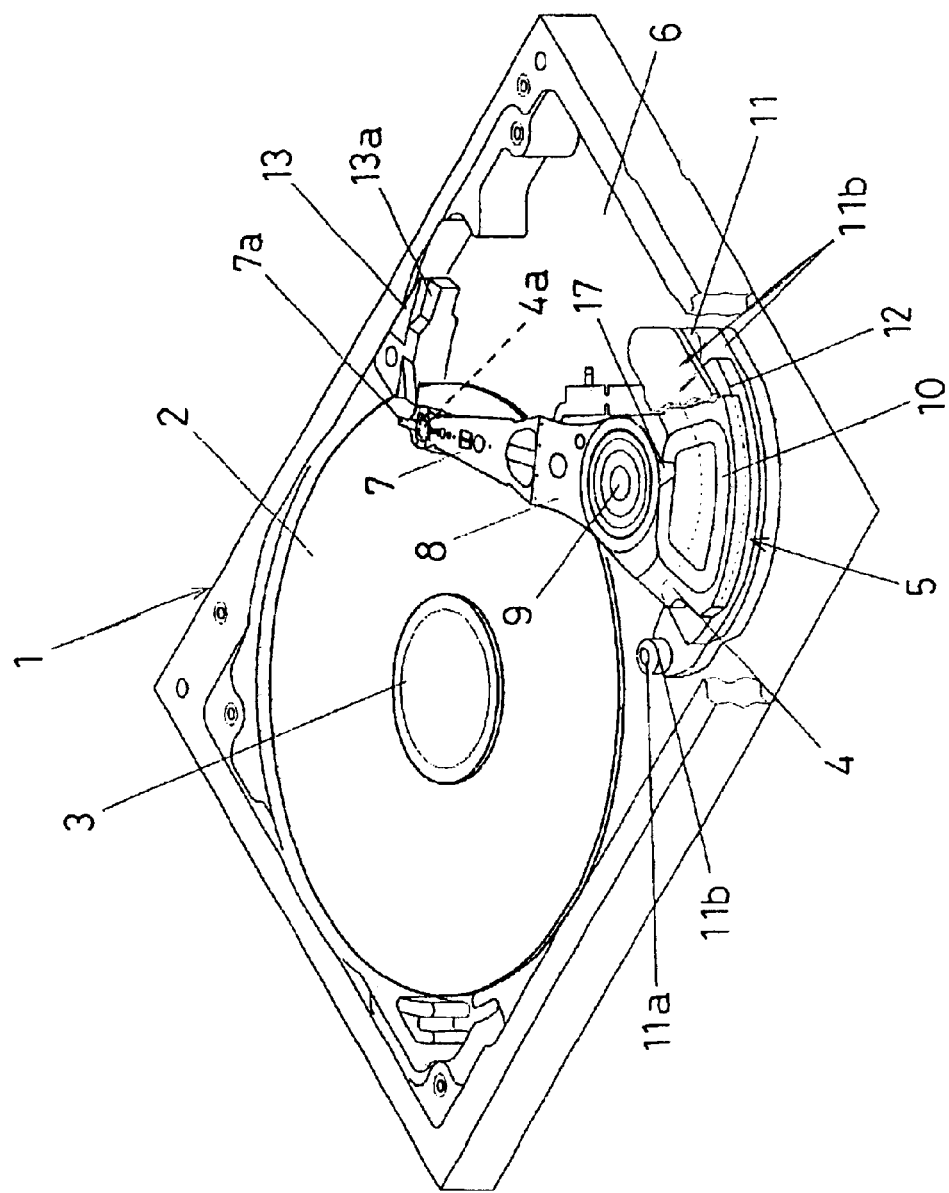
FIG. 1 is a perspective view showing a magnetic disk device according to a preferred embodiment of the present invention.

As shown in FIG. 1, in a magnetic disk device 1 of the present invention, a spindle motor (not shown) for holding a magnetic disk 2 between the spindle motor and a disk clamp 3 and rotating the magnetic disk 2, a carriage 4 having a magnetic head 4a for recording and reproducing information on the magnetic disk 2, and an actuator 5 for moving the magnetic head 4a via the carriage 4 are placed on a chassis 6.

An arm 8 having a suspension 7 for supporting the magnetic head 4a is mounted on one end of the carriage 4, and the carriage 4 is pivotally supported by a shaft 9 rotatably on the chassis 6, and a coil 10 is mounted on the other end of the carriage 4, the shaft 9 being placed between the ends.

The actuator 5 is a voice coil motor (VCM) and is constituted by the coil 10 placed on the other end of the carriage 4, and a magnetic circuit which applies a magnetic field on the coil 10 and generates driving force for rotating the carriage 4 around the shaft core of the shaft 9. The magnetic circuit is formed by a pair of yokes 11 and a magnet 12, in which the yokes 11 are opposed so as to form a prescribed gap in which the other end of the carriage 4 can move, and the magnet 12 is fixed on one of the opposing surfaces of the yokes 11. Reference numeral 11a denotes shafts for forming the gap between the yokes 11, and reference numeral 11b denotes stoppers which are placed on the outer circumference of the shafts 11a to suppress excessive rotation of the carriage 4. The shafts 11a and the stoppers 11b are provided in pairs.

A ramp 13 having an up grade and a down grade along the circumferential direction is provided on the circumference where the tip of the suspension 7 is moved on the side of the magnetic disk 2. When the magnetic disk device 1 is not operated, a load tab 7a at the tip of the suspension 7 is moved to a retreat position 13a after moving over the top of the ramp 13 to permit the suspension 7 (thus, the magnetic head 4a) to retreat from the magnetic disk 2.

The magnetic disk device 1 is different from a conventional disk in that instead of conventional lock part and magnet, a protrusion 17 attracted by the magnet 12 constituting the magnet circuit is provided on the carriage 4 as a locking mechanism.

Figure 2:
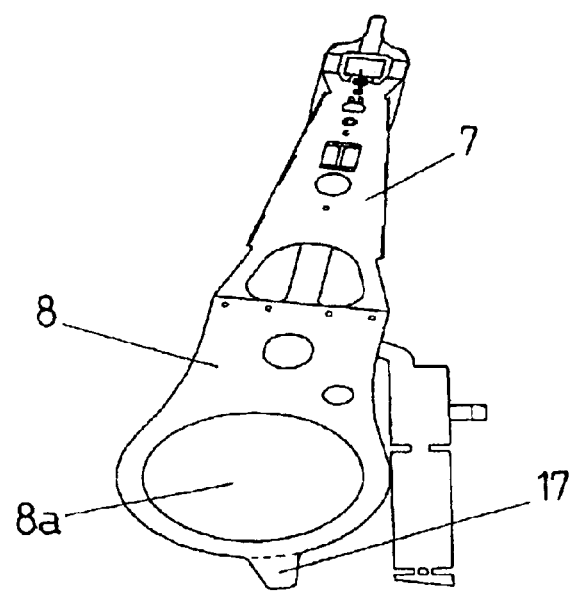
FIG. 2 is an enlarged view showing an arm having a magnetic head in the magnetic disk device of FIG. 1.

The protrusion 17 is made of a magnetic material. As shown in FIG. 2, the protrusion 17 is attached so as to extend outward along the diameter direction of a shaft hole 8a on a proximal end edge of the arm 8 (an edge opposite from the suspension 7) made of a non-magnetic material. Besides, the combination of the suspension 7 and the arm 8 is referred to as an arm in claim 1.

Figure 3A:
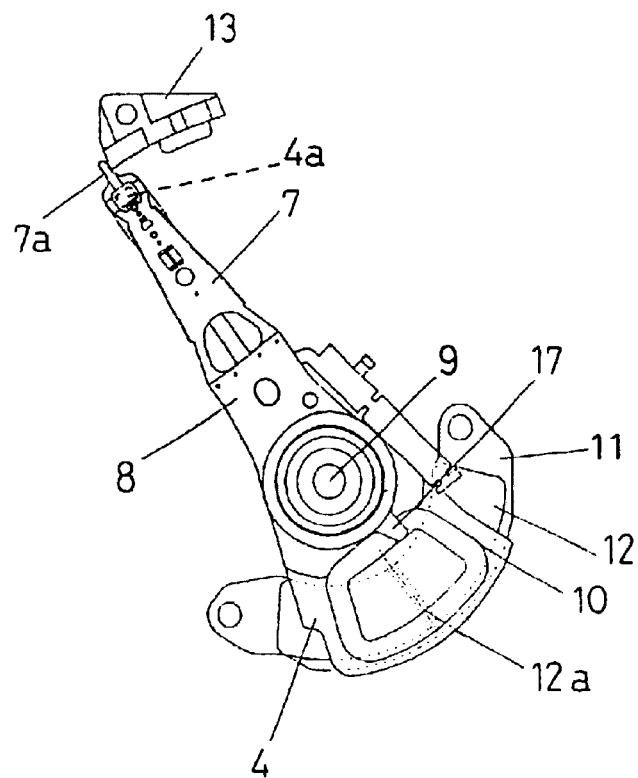
FIG. 3 shows an unloading state and a non-operating state of an arm in the magnetic disk device of FIG. 1.
Figure 3B:
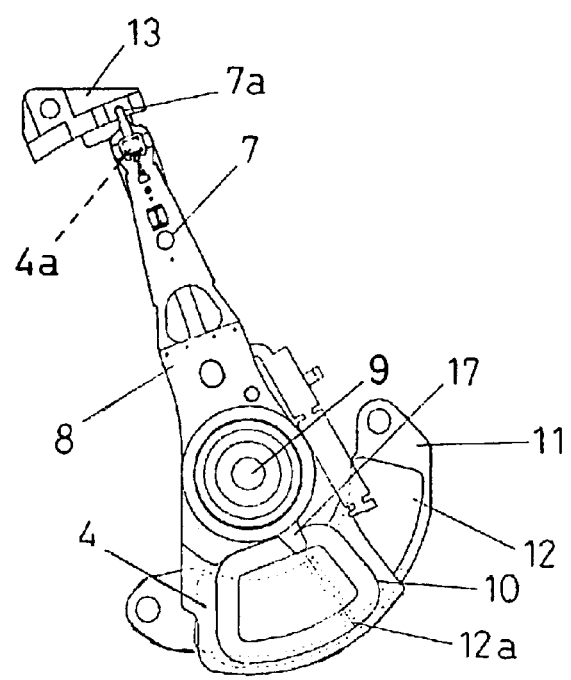
Figure 4:
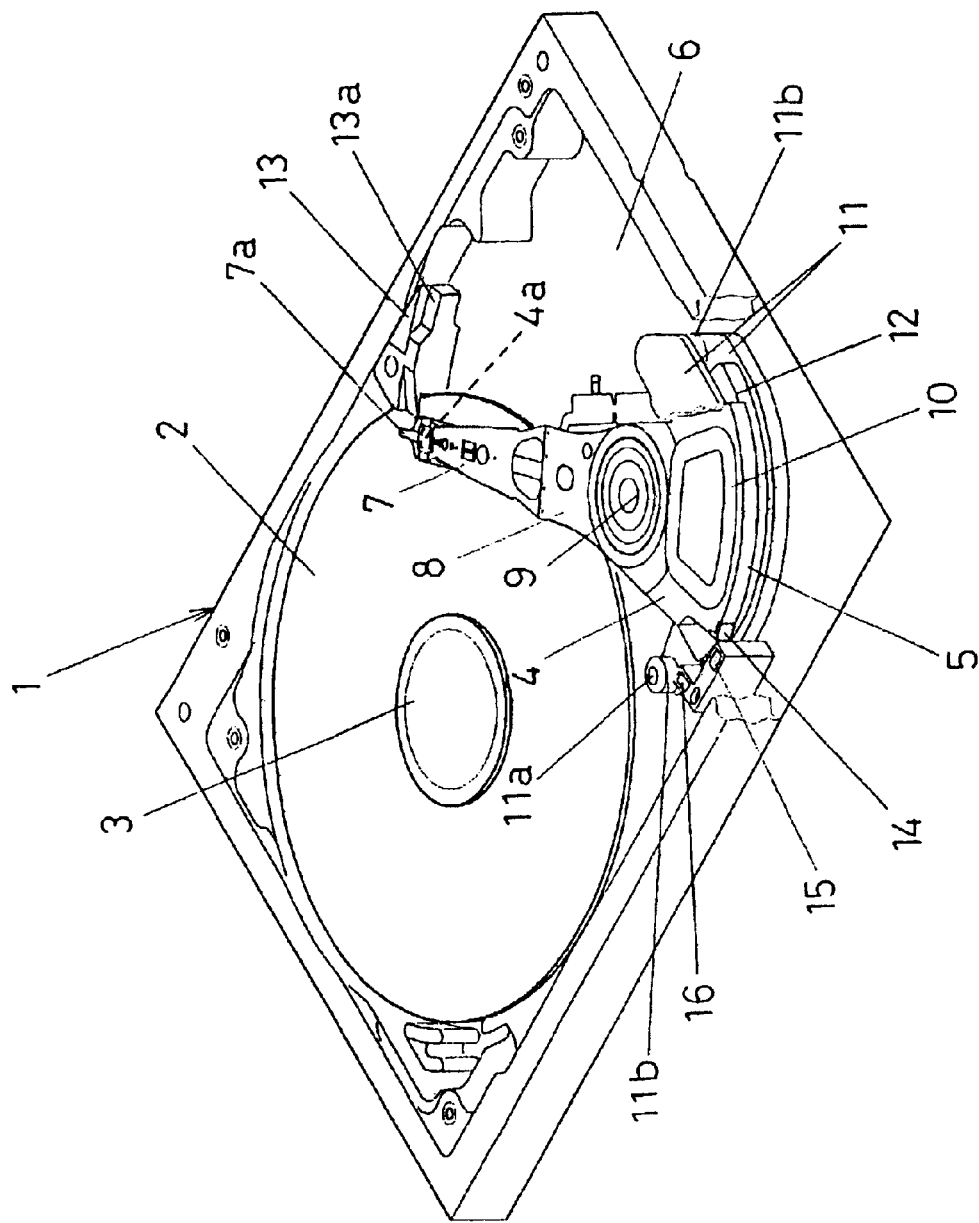
FIG. 4 is a perspective view showing a conventional magnetic disk device.
Figure 5:
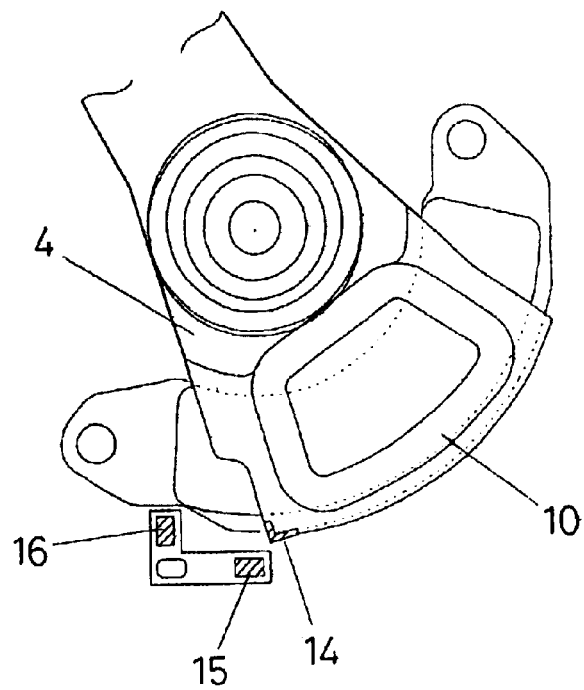
FIG. 5 shows a state of a carriage and an actuator of the magnetic disk device of FIG. 4 during unloading.
Figure 6:
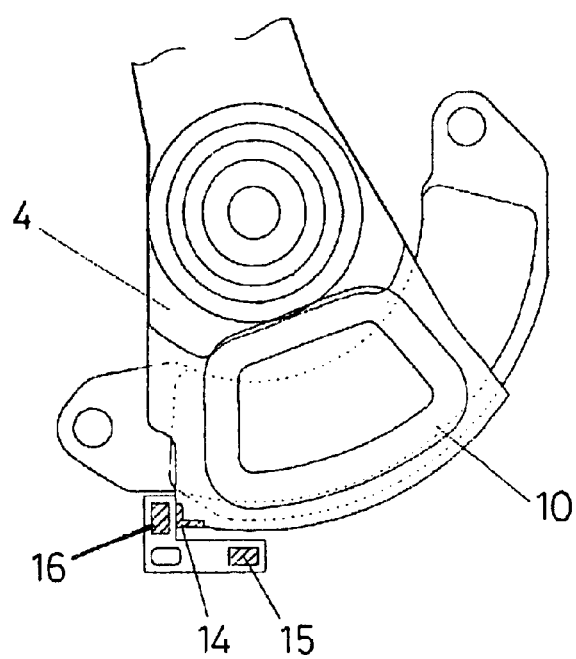
FIG. 6 shows a state of the carriage and the actuator in the magnetic disk device of FIG. 4 during non-operation.

As shown in FIGS. 3 (a) and 3 (b), the magnet 12 is formed like an arc so as to correspond to a moving region of the coil 10 on the carriage 4 which rotates around the shaft core of the shaft 9, and the magnet 12 has one end serving as the north pole and the other end serving as the south pole along the moving direction of the carriage 4. A boundary between the poles that is indicated by oblique lines is the highest magnetic flux part 12a between the yokes 11. For this reason, the protrusion 17 is formed in such a way that the protrusion 17 on the proximal end of the arm 8, which is opposite from the load tab 7a, faces the high magnetic flux part 12a of the magnet 12 at a position where the load tab 7a of the suspension 7 climbs up to the end of a oblique surface of the ramp 13.

Thus, when the load tab 7a of the suspension 7 starts climbing the oblique surface of the ramp 13 during unloading, the high magnetic flux part 12a having the highest magnetic flux in the gap between the yokes 11 attracts the protrusion 17. The attractive force is small but extraordinarily contributes to climbing of the load tab 7a on the oblique surface of the ramp 13, and the load tab 7a securely moves over the top of the ramp 13 and reaches the retreat position 13a.

Even when vibration and so on is applied when the device 1 is not operated, that is, when the load tab 7a is guided to the retreat position 13a, the magnet 12 continues to suck the protrusion 17 and maintains the rotation of the carriage 4 in a fixed direction to lock the carriage 4. Hence, the suspension 7 (thus, the magnetic head 4a) is positively maintained at a retreat position on the side of the magnetic disk 2.

In accordance with the rotation range of the carriage 4 and an inclination degree of the oblique surface of the 1 ramp 13, one of the following two functions described above is performed, that is, the function of assisting force for allowing the load tap 7a to climb the ramp 13 during unloading and the function of locking the carriage 4 during non-operation.

In the above-described embodiment, the protrusion 17 is made of a magnetic material (e.g., SUS 400 ) and is bonded to the arm 8 made of a non-magnetic material. Also even in the case of a non-magnetic material, for example, a SUS 300 material such as SUS 304, its construction changes and some magnetic properties are provided during processing. Thus, the arm 8 and the protrusion 17 may be integrally formed by using a non-magnetic material. Also in this case, the protrusion 17 magnetized by processing can be attracted onto the high magnetic flux part 12a having the highest magnetic flux in the gap between the yokes 11.

As described above, according to the present invention, with the simple configuration in which the protrusion 17 is provided on the proximal end of the arm 8, it is possible to assist driving force during unloading and lock the carriage 4 when the device is not operated, thereby achieving the locking mechanism which can respond to small devices without the necessity for a special space for placement or without increasing the number of parts.

What is claimed is:

1. A magnetic disk device comprising:
   a chassis and a ramp having a retreat position;
   a plurality of yokes having surfaces each having a fixing magnet and opposed to each other with a prescribed gap therebetween for forming a magnetic circuit;
   a carriage having an axis of rotation and comprising two ends with an arm on one of the ends and a coil on the other of the ends, said carriage being pivotally supported on the chassis, the arm having a tip and comprising a magnetic head on said tip, wherein:

said coil is located in the magnetic circuit and the carriage is rotatable around the axis of rotation by a driving force generated by said coil, thereby moving the tip of the arm having the magnetic head over a magnetic disk and a retreat position on the ramp located near such magnetic disk, each said fixing magnet comprises an arc-shaped segment corresponding to a path of movement of the coil, and has opposing pole ends for forming a magnetic field along the path of movement of the coil, a proximal end of said arm comprises a protrusion extending to the coil, said protrusion having a fixing position located so that said protrusion coincides substantially with an extended boundary plane between said poles and attractable by the fixing magnet to maintain the rotation of the carriage when the tip of the arm is moved to a position just before the retreat position of the ramp, thereby urging the tip of the arm toward said retreat position.

2. The magnetic disk device according to claim 1, wherein said protrusion is made of a magnetic material and is attached to a proximal end of the arm made of a non-magnetic material.

3. The magnetic disk device according to claim 1, wherein said arm is integral with said protrusion and said arm and said protrusion are made of a non-magnetic material and the protrusion has been magnetized during molding thereof.

* * * * *